(12) United States Patent
Kondo et al.

(10) Patent No.: US 6,983,591 B2
(45) Date of Patent: Jan. 10, 2006

(54) PARTICULATE FILTER REGENERATING DEVICE

(75) Inventors: Terunori Kondo, Yokohama (JP);
Jun-ichi Kawashima, Yokosuka (JP);
Naoya Tsutsumoto, Yokohama (JP);
Makoto Ohtake, Yokohama (JP);
Takao Inoue, Yokohama (JP);
Toshimasa Koga, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 67 days.

(21) Appl. No.: 10/714,841

(22) Filed: Nov. 18, 2003

(65) Prior Publication Data

US 2004/0118110 A1  Jun. 24, 2004

(30) Foreign Application Priority Data

Dec. 18, 2002  (JP) ............................. 2002-367231

(51) Int. Cl.
*F01N 3/00*  (2006.01)

(52) U.S. Cl. ........................... 60/295; 60/274; 60/286; 60/297; 60/311

(58) Field of Classification Search ................. 60/280, 60/285, 286, 295, 297, 311; 55/DIG. 30
See application file for complete search history.

(56) References Cited

U.S. PATENT DOCUMENTS

| 4,974,414 | A | | 12/1990 | Kono et al. | |
|---|---|---|---|---|---|
| 5,319,930 | A | * | 6/1994 | Shinzawa et al. | 60/286 |
| 5,511,413 | A | | 4/1996 | Pfister et al. | |
| 5,716,586 | A | * | 2/1998 | Taniguchi | 422/173 |
| 6,497,095 | B2 | * | 12/2002 | Carberry et al. | 60/295 |
| 6,666,020 | B2 | * | 12/2003 | Tonetti et al. | 60/286 |
| 6,851,258 | B2 | * | 2/2005 | Kawashima et al. | 60/311 |

FOREIGN PATENT DOCUMENTS

| EP | 1087114 A | 3/2001 |
|---|---|---|
| JP | 07-034853 A | 2/1995 |

* cited by examiner

Primary Examiner—Binh Q. Tran
(74) Attorney, Agent, or Firm—Shinjyu Global IP Counselors, LLP.

(57) ABSTRACT

A particulate filter regenerating device is configured to prevent the uneven distribution of particulate matter that results from interruption of the regeneration process and protect the particulate filter. The frequency with which regeneration is executed is increased by determining that it is time to regenerate the particulate filter at a time $t1$ when the exhaust gas temperature Texhin has reached or exceeded a prescribed temperature Texh1. Additionally, particulate filter regenerating device determines that it is time to regenerate the particulate filter when the quantity of accumulated particulate matter reaches or exceeds a prescribed value PM1. The particulate filter is regenerated by raising the temperature of the exhaust gas and combusting the accumulated particulate matter.

20 Claims, 6 Drawing Sheets

PARTICULATE FILTER REGENERATING DEVICE

BACKGROUND OF THE INVENTION

1. Field of the Invention

The present invention generally relates to a particulate filter regenerating device for a particulate filter used to after-treat the exhaust gas of engines, especially diesel engines. The present invention also generally relates to an engine exhaust gas cleaning device that utilizes such a particulate filter regenerating device.

2. Background Information

Diesel particulate filters are particulate matter collecting devices comprising a honeycomb monolith made of ceramic or the like. Diesel particulate filters are generally used to remove particulate substances (hereinafter called "particulates") from the exhaust gas discharged by diesel engines. During operation, particulates gradually accumulate in the diesel particulate filter. Eventually, the quantity of accumulated particulate matter exceeds an allowed quantity and clogging occurs. Once the particulate filter is clogged, this causes the exhaust pressure to rise and the operation of the engine to be adversely affected. As a result, it is necessary to periodically remove the accumulated particulate matter from the particulate filter so that clogging does not occur.

One known regeneration process for removing particulates from diesel particulate filters is disclosed in Japanese Laid-Open Patent Publication No. 7-034853. The regeneration process of this publication proposes to raise the temperature of the exhaust gas above normal and feed the exhaust gas into the filter, thus heating and combusting the accumulated particulate matter.

This publication discloses that the time to regenerate a diesel particulate filter is determined by calculating the pressure difference across the diesel particulate filter by measuring the pressure inside the exhaust passage at the front and rear of the filter and estimate the quantity of accumulated particulate matter based on the calculated pressure difference and the exhaust gas flow rate (which can be calculated based on the intake air flow rate, etc.). When the estimated quantity of accumulated particulate matter reaches a prescribed quantity, the system determines that it is time to regenerate the filter.

When it is determined that it is time to regenerate the diesel particulate filter, the diesel particulate filter is regenerated by executing control that raises the temperature of the exhaust gas above what is normal and heats the accumulated particulate matter to or above a combustion temperature.

In view of the above, it will be apparent to those skilled in the art from this disclosure that there exists a need for an improved particulate filter regenerating device. This invention addresses this need in the art as well as other needs, which will become apparent to those skilled in the art from this disclosure.

SUMMARY OF THE INVENTION

It has been discovered that when the regeneration timing for regenerating a particulate filter is determined by comparing the quantity of accumulated particulate matter with a prescribed value, the following problem occurs.

Since regeneration is not commenced until a certain quantity of particulate matter has accumulated in the particulate filter, a considerable amount of time is required to combust the particulate matter completely. If, during regeneration, the engine shifts to an operating region where the exhaust gas temperature is normally low and cannot be raised to a temperature that would allow combustion of the particulate matter, the combustion of the particulate will stop and the regeneration will be interrupted. Afterwards, the filter will resume collection of particulates and regeneration will be repeated when the quantity of accumulated particulate matter reaches the same prescribed value, but there will be cases where the combustion will again be stopped midway through the regeneration process. When the regeneration process is interrupted repeatedly, the distribution of the particulate matter within the particulate filter becomes uneven. Then, when regeneration is started under conditions of uneven accumulation of the particulate matter, the heating of the particulate filter becomes excessive at the portions where the particulate matter is concentrated and the durability or service life of the particulate filter declines.

Therefore, the objects of the present invention are to increase the frequency with which regeneration is executed so as to promote complete regeneration and keep the quantity of particulate matter accumulated in the particulate filter low at all times and to protect the particulate filter from thermal loads caused by an uneven distribution of particulate matter. The present invention accomplishes these objects by determining the timing for regenerating the particulate filter based on conditions related to the temperature of the exhaust gas.

A particulate filter regeneration device in accordance with the present invention determines that it is time to regenerate the particulate filter and executes control to combust the particulate matter when the exhaust gas temperature is equal to or above a prescribed temperature.

It is good to detect the quantity of particulate accumulated in the particulate filter (hereinafter called "accumulated particulate quantity") and determine that it is time to regenerate the particulate filter when the detected accumulated particulate quantity reaches a prescribed quantity or when the exhaust gas temperature is equal to or greater than a prescribed temperature.

In this way, the particulate matter can be combusted completely within a short period of time after regeneration starts because regeneration is started while the quantity of accumulated particulate is still comparatively small. As a result, the frequency with which regeneration is interrupted due to the vehicle shifting to a region of low travel speed or the like while regeneration is in progress can be reduced and the particulate matter can be prevented from becoming unevenly distributed.

In view of the above, a particulate filter regenerating device is provided that basically comprises a regeneration timing determining section and a regeneration control section. The regeneration timing determining section is configured to determine a regeneration timing to initiate regeneration of a particulate filter by combusting particulate matter that has accumulated in the particulate filter at least when the exhaust gas temperature is equal to or greater than a prescribed temperature. The regeneration control section is configured to execute control to combust particulate matter based on the regeneration timing determined by the regeneration timing determining section.

The present invention also includes the idea of constructing an engine exhaust gas cleaning device that includes such a particulate filter regenerating device.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
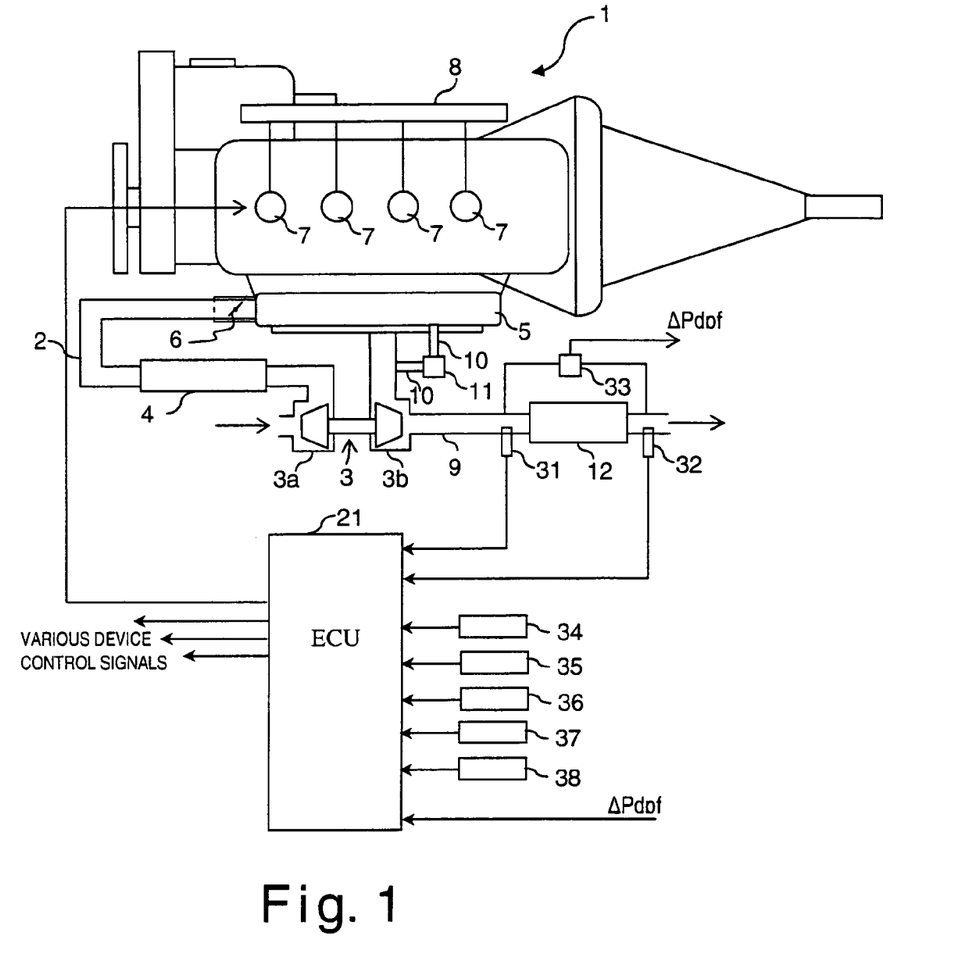
FIG. 1 is a block diagram of a diesel engine in accordance with a preferred embodiment of the present invention.

Referring initially to FIG. 1, a schematic diagram of a direct injection diesel engine 1 is illustrated in accordance with a first embodiment of the present invention. The diesel engine 1 is preferable used in an automobile. The diesel engine 1 is well known in tho art. Since diesel engines are well known in the art, the precise structure of the diesel engine 1 will not be discussed or illustrated in detail herein.

An air cleaner (not shown) is installed at the inlet part of the air intake passage 2 to remove dust and particles from intake air to the diesel engine 1. A variable nozzle turbocharger 3 is operatively coupled to diesel engine 1. The turbocharger 3 includes a compressor part 3a installed in the air intake passage 2 downstream of the air cleaner and a turbine part 3b installed in an exhaust passage 9. The intake air that has passed through the air cleaner is compressed by the compressor part 3a and fed onward to an intercooler 4. The intercooler 4 is installed downstream of the compressor part 3a such that the intake air discharged from the compressor part 3a is cooled by the intercooler 4. A throttle valve 6 is installed immediately upstream of a surge tank 5. Thus, the cooled intake air from the intercooler 4 passes through the throttle valve 6 and into the surge tank 5 before being distributed to the individual cylinders at a manifold section of the diesel engine 1.

Regarding the engine main body, the diesel engine 1 includes a cylinder head with a plurality of fuel injectors 7. The fuel injectors 7 are fixed to the cylinder head so as to face the approximate center of the upper part of the combustion chamber of each cylinder. The fuel system of the diesel engine 1 includes a common rail 8. Fuel pumped by a fuel pump (not shown) is delivered to the injectors 7 through the common rail 8 in a conventional manner. The injectors 7 operate in response to a fuel injection signal sent from an electronic control unit or "ECU" 21. The injectors 7 are configured and arranged to execute fuel injections in several stages. In addition to the main injection that serves to control the torque of the diesel engine 1, the injectors 7 perform a pilot injection for reducing the quantity of particulates generated and a post injection for increasing the temperature of the exhaust gas when the diesel particulate filter 12 is being regenerated. The pilot injection is performed at a more advanced timing than the main injection and the post injection is performed at a more retarded timing than the main injection.

Meanwhile, the turbine part 3b of the turbocharger 3 is installed downstream of the manifold section in the exhaust passage 9. The turbine part 3b of the turbocharger 3 has movable vanes in which the vane angles of the movable vanes are controlled in accordance with the operating conditions by a supercharging pressure control signal from the electronic control unit 21.

The diesel particulate filter 12 is installed downstream of the turbine part 3b to after-treat the exhaust gas. The particulates in the exhaust gas are removed from the exhaust gas as the exhaust gas passes through the diesel particulate filter 12. An EGR pipe 10 for recirculating exhaust gas (EGR) is connected between the exhaust passage 9 and the air intake passage 2 (i.e., the surge tank 5 in this embodiment) and an EGR control valve 11 is installed in the EGR pipe 10. An appropriate amount of exhaust gas is recirculated to the air intake passage 2 in accordance with the opening degree of the EGR control valve 11, which operates in response to an EGR control signal from the electronic control unit 21.

The exhaust gas cleaning device of the diesel engine 1 in this embodiment includes the diesel particulate filter 12 and the regenerating device, which comprises the electronic control unit 21 and sensors 31–37 as discussed below. The diesel particulate filter 12 has a honeycomb monolith made of ceramic or the like. The basic structure of the diesel particulate filter 12 is well known in the art. Since diesel particulate filters are well known in the art, the precise structure of the diesel particulate filter 12 will not be discussed or illustrated in detail herein.

The electronic control unit 21 preferably includes a microcomputer with a regenerative particulate filter control program that controls the fuel injectors as discussed below. The electronic control unit 21 can also include other conventional components such as an input interface circuit, an output interface circuit, and storage devices such as a ROM (Read Only Memory) device and a RAM (Random Access Memory) device. The microcomputer of the electronic control unit 21 is programmed to control the regeneration of the particulate filter 12. The memory circuit stores processing results and control programs are run by the processor circuit. The electronic control unit 21 is operatively coupled to the sensors 31–38 in a conventional manner. The internal RAM of the electronic control unit 21 stores statuses of operational flags and various control data. The internal ROM of the electronic control unit 21 stores various operations as needed and/or desired. It will be apparent to those skilled in the art from this disclosure that the precise structure and algorithms for electronic control unit 21 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The sensors 31–38 of the regenerating device send signals to the electronic control unit 21 for the purpose of regenerating the diesel particulate filter 12. The exhaust gas temperature sensors 31 and 32 are configured and arranged to detect the exhaust gas temperatures Texhin and Texhout at the inlet and outlet, respectively, of the diesel particulate filter 12. The exhaust gas temperature sensor 31 is configured and arranged to produce a signal indicative of the exhaust gas temperature Texhin at the inlet of the diesel particulate filter 12 that is sent to the electronic control unit 21. The exhaust gas temperature sensor 32 is configured and arranged to produce a signal indicative of the exhaust gas temperature Texhout at the outlet of the diesel particulate filter 12 that is sent to the electronic control unit 21.

The filter pressure difference sensor 33 is configured and arranged to detect the pressure difference (hereinafter called "filter pressure difference") $\Delta Pdpf$ across the diesel particulate filter 12. The filter pressure difference sensor 33 is configured to produce a signal indicative of the filter pressure difference that is sent to the electronic control unit 21.

The air flow meter 34 is configured and arranged to detect air flow of in the air intake passage 2. The air flow meter 34 is configured to produce a signal indicative of the intake air flow rate of the air intake passage 2 that is sent to the electronic control unit 21.

The crank angle sensor 35 is configured and arranged to detect the crank angle of the crank shaft of the diesel engine 1. The crank angle sensor 35 is configured to produce a signal indicative of the crank angle that is sent to the electronic control unit 21.

The accelerator position sensor 36 is configured and arranged to detect the depression amount of the accelerator pedal. The accelerator position sensor 36 is configured to produce a signal indicative of the depression amount of the accelerator pedal that is sent to the electronic control unit 21.

The throttle opening degree sensor 37 is configured and arranged to detect throttle opening degree of the throttle valve 6. The throttle opening degree sensor 37 is configured to produce a signal indicative of the throttle opening degree that is sent to the electronic control unit 21.

The vehicle speed sensor 38 is configured and arranged to detect the vehicle speed. The vehicle speed sensor 38 is configured to produce a signal indicative of the vehicle speed that is sent to the electronic control unit 21.

The operation of the electronic control unit 21 in relation to the regeneration of the diesel particulate filter 12 will now be described with reference to the flowcharts of FIGS. 2–4.

Figure 2:
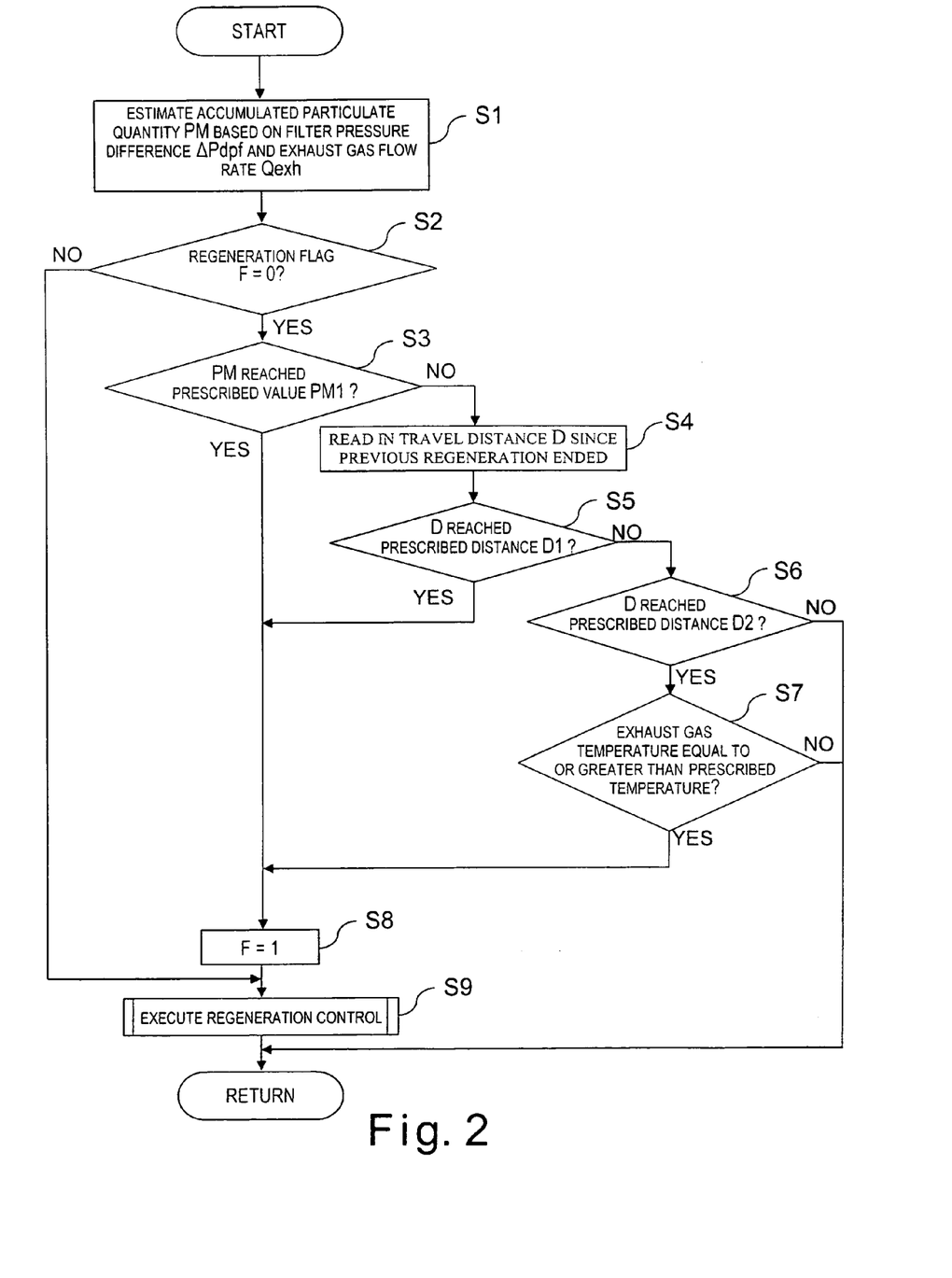
FIG. 2 is a flowchart showing a regeneration timing determination routine for a diesel particulate filter used in the diesel engine illustrated in FIG. 1 in accordance with the present invention.

First, the electronic control unit 21 executes the steps of the flowchart shown in FIG. 2 to determine the regenerate timing of the diesel particulate filter 12, i.e., if it is time to regenerate the diesel particulate filter 12. Only if the electronic control unit 21 determines that it is time for regeneration does the electronic control unit 21 proceed to step S9 and execute the processing for regenerating the diesel particulate filter 12. Also, in this embodiment, the steps S1 and S3 to S7 of the flowchart shown in FIG. 2 constitute the regeneration timing determining section as will become apparent form the following explanation.

In step S1, the electronic control unit 21 reads in the filter pressure difference $\Delta Pdpf$ and the exhaust gas flow rate Qexh and, based on the filter pressure difference $\Delta Pdpf$ and the exhaust gas flow rate Qexh, estimates the accumulated particulate quantity PM, i.e., the quantity of particulates accumulated in the diesel particulate filter 12. The accumulated particulate quantity PM is estimated by referring to a map in which the accumulated particulate quantity PM values are allocated in accordance with the filter pressure difference $\Delta Pdpf$ and the exhaust gas flow rate Qexh. The exhaust gas flow rate Qexh can be calculated based on the intake air flow rate Qa detected by the air flow meter 34.

In step S2, the electronic control unit 21 checks if the regeneration flag F is 0. If the regeneration flag F is determined to be 0, the electronic control unit 21 proceeds to step S3. If the regeneration flag F is not 0, the electronic control unit 21 proceeds to step S9. The regeneration flag F is set to 0 when the engine 1 is started and then the regeneration flag F is set to 1 when it is time to regenerate the diesel particulate filter 12.

In step S3, the electronic control unit 21 determines if the accumulated particulate quantity PM has reached a prescribed value PM1. Also, in this embodiment, the step S3 of the flowchart shown in FIG. 2 constitute an accumulated particulate quantity section configured to detect the quantity of particulate matter that has accumulated within the particulate filter 12. The electronic control unit 21 then proceeds to step S8 if it determines that the prescribed value PM1 has been reached. On the other hand, the electronic control unit 21 then proceeds to step S4 if it determines that the prescribed value PM1 has not been reached. The prescribed value PM1 is established in advance as a value indicating the maximum allowable quantity of particulate matter accumulated in the diesel particulate filter 12.

In step S4, the electronic control unit 21 reads in the travel distance D, which is the distance the vehicle has traveled since the immediately previous regeneration processing ended. The travel distance D can be calculated by integrating the product of the vehicle speed VSP detected by the vehicle speed sensor 38 and the control period $\Delta tvsp$ of the travel distance computing routine ($D=\Sigma(VSP \times \Delta tvsp)$).

In step S5, the electronic control unit 21 determines if the travel distance D since the previous regeneration ended has reached a prescribed distance D1. The electronic control unit 21 proceeds to step S8 if the prescribed distance D1 has been reached. On the other hand, the electronic control unit 21 then proceeds to step S6 if the prescribed distance D1 has not been reached. Step S5 is provided as a backup. That is, if the regeneration timing determination is erroneous in step S3 because of an inaccurate estimate of the accumulated particulate quantity PM, the regeneration processing will be executed in view of the travel distance.

In step S6, the electronic control unit 21 determines if the travel distance D since the previous regeneration ended has reached a second prescribed distance D2(<D1). The electronic control unit 21 proceeds to step S7 if the prescribed distance D2 has been reached and returns to the main routine if the prescribed distance D2 has not been reached. The second prescribed distance D2 is not large enough to require immediate removal of the particulate matter accumulated in the diesel particulate filter 12 but it is set to a traveling distance for which, depending on the exhaust gas temperature conditions discussed later, it can be determined that it is preferred to go ahead and remove the particulate matter.

In step S7, the electronic control unit 21 reads in the exhaust gas temperature Texhin (hereinafter called "filter inlet exhaust gas temperature") at the inlet of the diesel particulate filter 12 and determines if it is greater than or equal to a prescribed temperature Texh1. If the filter inlet exhaust gas temperature is determined by the electronic control unit 21 to be greater than or equal to the prescribed temperature Texh1, then the electronic control unit 21 proceeds to step S8. If the electronic control unit 21 determines the filter inlet exhaust gas temperature to be less than the prescribed temperature Texh1, the electronic control unit 21 returns to the main routine.

In step S8, the regeneration flag F is set to 1. In step S9, the diesel particulate filter 12 is regenerated as described below.

When the electronic control unit 21 determines that it is time to regenerate the diesel particulate filter 12, it follows the steps of the flowchart of FIG. 3 and sets a device control quantity increasing/decreasing value dCONT for the devices (hereinafter called "regeneration control devices") that are controlled to raise the temperature of the exhaust gas and thereby combust and remove the accumulated particulate matter. The regeneration control devices of this embodiment include the injectors 7, the turbocharger 3, the EGR control valve 11, and the intake air throttle valve 6. By setting the value dCONT, at least one of the following quantities is adjusted: the main injection timing of the injectors 7; the post injection timing of the injectors 7; the post injection quantity of the injectors 7; the vane angle of the turbocharger 3; the opening degree of the EGR control valve 11; and the opening degree of the intake air throttle valve 6. The following table shows the dCONT items and descriptions of how the regeneration control devices are controlled when the temperature of the exhaust gas is raised.

TABLE 1

| Device | dCONT | Control Description |
| --- | --- | --- |
| Injectors | Main injection timing | Retarded |
| | Post injection timing | Retarded |
| | Post injection quantity | Increased |
| Turbocharger | Supercharging pressure | Reduced |
| EGR control valve | Opening degree | Closed |
| Intake air throttle valve | Opening degree | Closed |

The device control quantity increasing/decreasing value dCONT is set in step S11. The value dCONT is set as a value used to increase or decrease the device control quantity base value CONT. The device control quantity increasing/decreasing value dCONT is read from a map that allocates the value dCONT in accordance with the operating conditions (e.g., fuel injection quantity Tp and engine rotational speed Ne). The regeneration control devices (sometimes a single device, sometimes a plurality of devices) with respect to which the value dCONT is set differ depending on the operating conditions. In order to obtain the exhaust gas temperature required to bring the accumulated particulate matter to the combustion temperature or higher, the value dCONT is set with respect to one or a plurality of regeneration control devices in accordance with the operating conditions.

In step S12, the electronic control unit 21 adds the device control quantity increasing/decreasing value dCONT to the device control quantity base value CONT to determine the final device control quantity CONT (=CONT+dCONT). Steps S11 and S12 constitute the exhaust gas temperature raising section.

Figure 4:
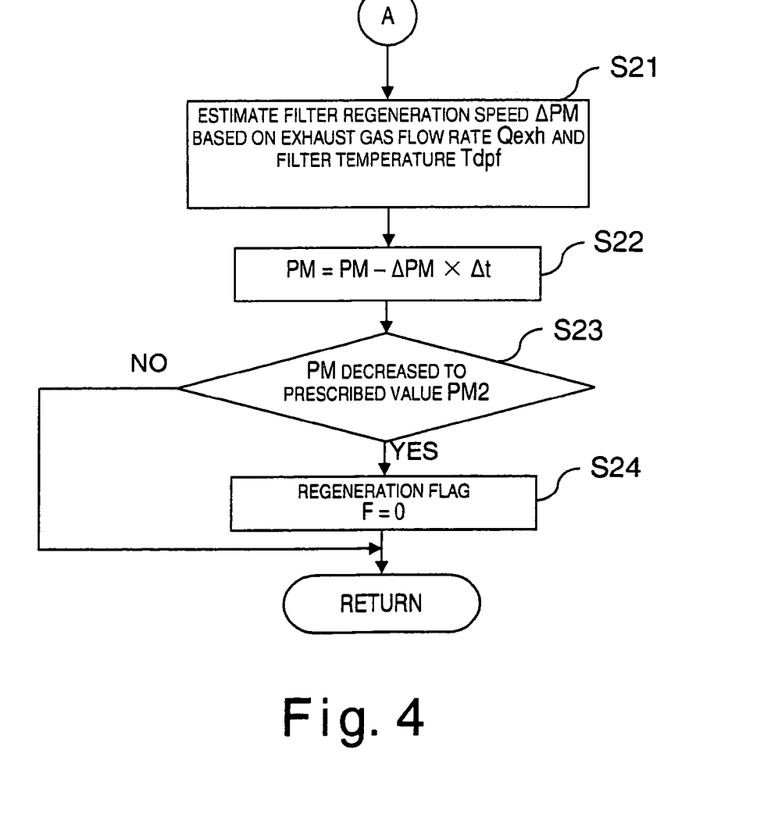
FIG. 4 is a flowchart showing a regeneration end determination routine for a diesel particulate filter used in the diesel engine illustrated in FIG. 1 in accordance with the present invention.

In addition to combusting the particulate matter accumulated in the diesel particulate filter 12 as previously described, the electronic control unit 21 ends the regeneration according to the flowchart of FIG. 4.

In step S21, the electronic control unit 21 reads the exhaust gas flow rate Qexh and the temperature Tdpf (hereinafter called "filter temperature") of the diesel particulate filter 12 and, based on the exhaust gas flow rate Qexh and the filter temperature Tdpf, estimates the regeneration speed $\Delta$PM (hereinafter called "filter regeneration speed" and indicating the quantity of particulate matter combusted per unit time) of the diesel particulate filter 12. The estimation of the filter regeneration speed $\Delta$PM is accomplished by referring to a map that allocates the filter regeneration speed $\Delta$PM in accordance with the exhaust gas flow rate Qexh and the filter temperature Tdpf. The filter temperature Tdpf is calculated using the average of the exhaust gas temperatures Texhin and Texhout at the inlet and outlet of the diesel particulate filter 12 (Tdpf=k×(Texhin+Texhout)/2, where k is a coefficient).

In step S22, the electronic control unit 21 subtracts the quantity of particulate matter removed by combustion from the accumulated particulate quantity PM estimated in step S1 to calculate the remaining particulate quantity PM(=PM−$\Delta$PM×$\Delta$t, where $\Delta$t is the period of the control cycle).

In step S23, the electronic control unit 21 determines if the accumulated particulate quantity PM has decreased to a second prescribed quantity PM2(<PM1). If it determines that the second prescribed quantity PM2 has been reached, the electronic control unit 21 proceeds to step S24. If the electronic control unit 21 determines that the second prescribed quantity PM2 has not been reached, the electronic control unit 21 returns to the main routine. The second prescribed quantity PM2 is set in advance as a value indicating that the particulates have been completely removed.

In step S24, the electronic control unit 21 sets the regeneration flag F to 0 and returns the exhaust gas temperature to a normal temperature by executing the subsequent processing.

Figure 5:
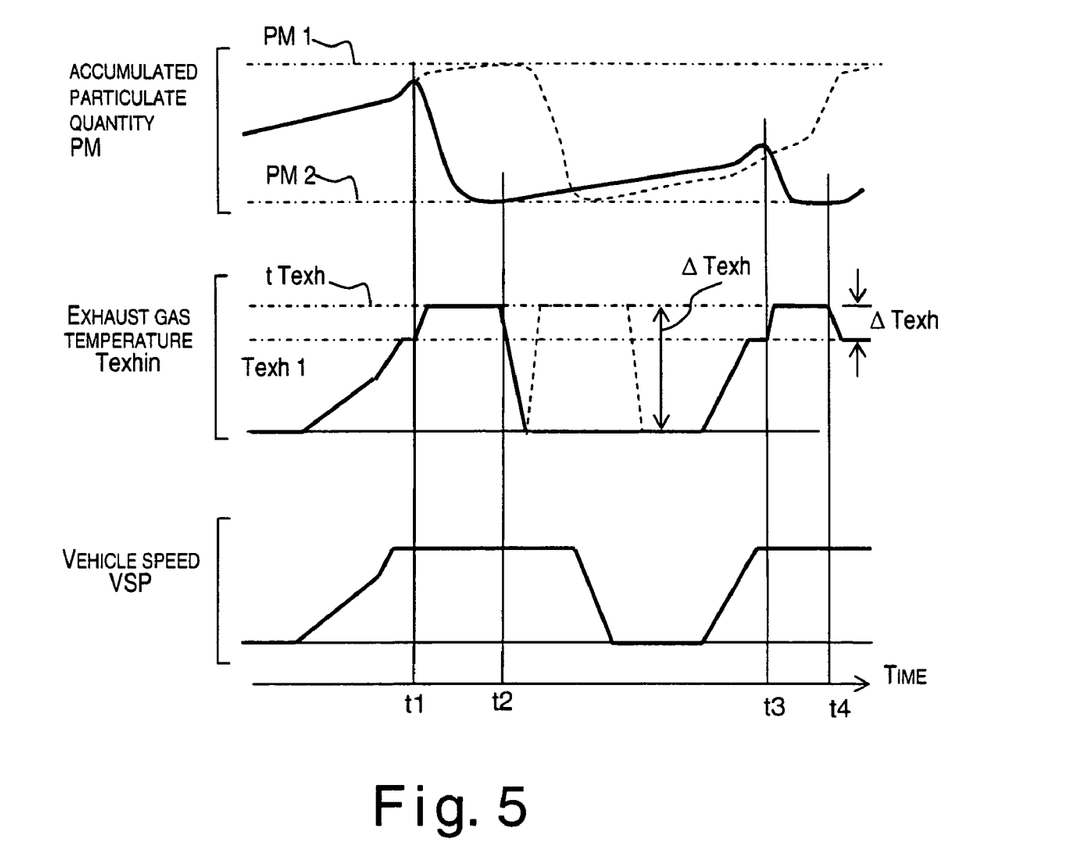
FIG. 5 shows the change in the accumulated particulate quantity and the exhaust gas temperature (exhaust gas temperature at the inlet of the filter) during regeneration.

The operation just described will now be explained using the time chart of FIG. 5, which shows the relationship between the accumulated particulate quantity PM and the filter inlet exhaust gas temperature Texhin.

Particulates exhausted from the engine 1 accumulate steadily in the diesel particulate filter 12. At some point in time, the electronic control unit 21 determines that it is time to regenerate the diesel particulate filter 12 because the travel distance D since the previous regeneration ended has reached the second prescribed distance D2 and the filter inlet exhaust gas temperature Texhin has reached the prescribed temperature Texh1 (step S7).

At time t1, the electronic control unit 21 starts the type of regeneration in which the temperature of the exhaust gas is raised by setting an increasing/decreasing value dCONT with respect to the device control quantity base values CONT of specific regeneration control devices selected in accordance with the operating conditions (step S9). Some time is allowed to elapse from when the filter inlet exhaust gas temperature Texhin reaches the prescribed temperature Texh1 until the exhaust gas temperature is actually raised. This is done to be certain that the exhaust gas temperature is only raised when it is anticipated that the increase in the vehicle speed VSP is not momentary and an operating state in which the exhaust gas temperature is high will continue. When the exhaust gas temperature is raised, the diesel particulate filter 12 is heated and the accumulated particulate matter soon begins to combust.

At time t2, the electronic control unit 21 determines that the accumulated particulate quantity PM has decreased to the second prescribed quantity PM2 and ends the regeneration of the diesel particulate filter 12 (step S23). Then, the electronic control unit 21 outputs the base value as the device control quantity CONT and returns the exhaust gas temperature to the normal temperature.

Later, the filter inlet exhaust gas temperature Texhin again reaches the prescribed temperature Texh1. Even though the accumulated particulate quantity PM has not reached the first prescribed quantity PM1, the electronic control unit 21 again sets a device control quantity increasing/decreasing value dCONT and executes regeneration in the same manner at time t3 so long as the travel distance D since the previous regeneration ended has reached the second prescribed distance D2.

This embodiment preferably provides the following effects.

Firstly, this embodiment executes regeneration processing when the filter inlet exhaust gas temperature Texhin is equal to or greater than a prescribed temperature Texh1 even if the accumulated particulate quantity PM has not reached the first prescribed quantity PM1, which is the maximum allowable quantity. In this way, the particulate matter can be combusted completely within a short period of time after regeneration starts because regeneration is started while the quantity of accumulated particulate matter is still comparatively small. As a result, the frequency with which regeneration is interrupted due to the vehicle shifting to an idling region or a region of low travel speed (20 to 30 km/h), where the temperature of the exhaust gas is inherently low and it is difficult to raise the exhaust gas to the temperature required for combusting the particulate matter, while regeneration is in progress can be reduced and the particulate matter can be prevented from becoming unevenly distributed. Thus, the diesel particulate filter 12 can be protected.

Secondly, this embodiment suppresses the degradation of fuel economy that occurs during regeneration. If the diesel particulate filter 12 must be regenerated in an operating region where the temperature of the exhaust gas is inherently low, the temperature rise amount $\Delta$Texh through which the exhaust temperature must be raised in order to reach the temperature tTexh required to combust the particulate matter is large, as indicated by the dotted line in FIG. 5. This is undesirable even if it does not involve interruption of the regeneration process. Conversely, with this embodiment, the filter 12 is regenerated when the exhaust gas temperature is at or above a prescribed temperature Texh1. As a result, the amount by which the exhaust gas temperature must be raised is small.

Thirdly, this embodiment increases the frequency with which regeneration is executed in comparison with a case (dotted line in FIG. 5) where the regeneration timing of the diesel particulate filter 12 is determined solely by comparing the accumulated particulate quantity PM with a prescribed quantity PM1. As a result, the accumulated particulate quantity PM can be held to a small quantity at all times, thus reducing the exhaust flow resistance of the engine 1 and improving fuel economy.

In view of the effects just described, the setting of the prescribed temperature Texh1 will now be explained using the exhaust gas isotherm diagram of FIG. 6.

Figure 6:
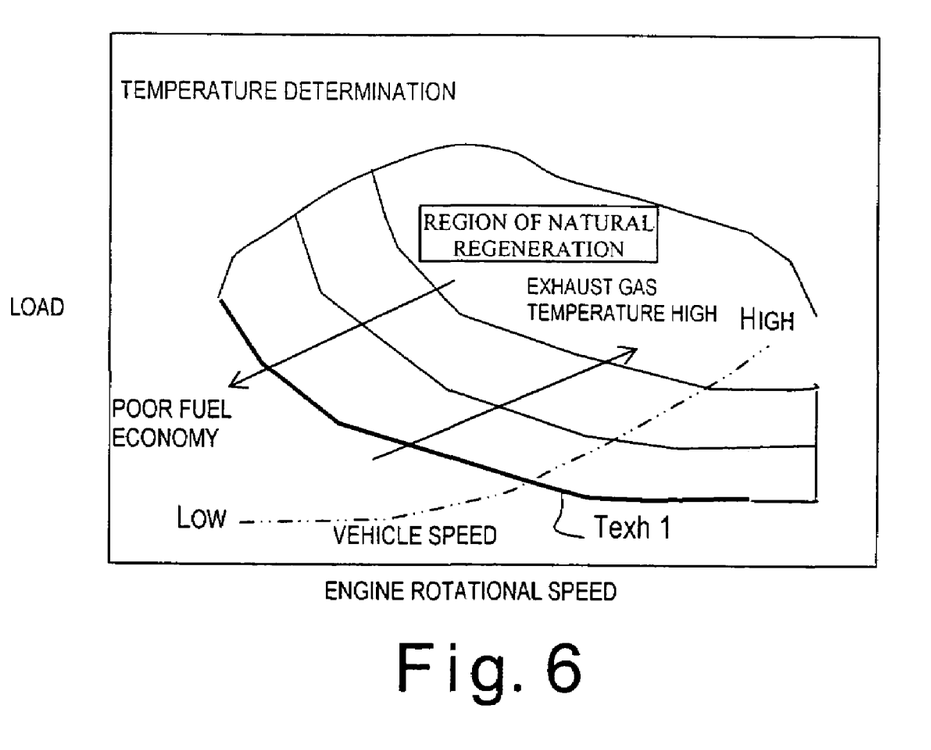
FIG. 6 is a graph that shows the regeneration regions of the diesel particulate filter.

In FIG. 6, the double-dotted chain line indicates a practical operating region according to the vehicle speed VSP. The exhaust gas temperature generally tends to increase as the vehicle speed increases, i.e., as operating state of the engine 1 enters a region of higher rotational speeds and higher loads. An exhaust gas temperature of approximately 550° C. or higher is required to combust the accumulated particulate matter and regenerate the diesel particulate filter 12. When the exhaust gas is below this temperature, the exhaust gas temperature is raised by setting a device control quantity increasing/decreasing value dCONT as described previously. Although the regeneration timing is determined by detecting when the filter inlet exhaust gas temperature Texhin is equal to or higher than the prescribed temperature Texh1, there is also a natural regeneration region where the particulate matter can be combusted without raising the temperature of the exhaust gas. In that region, the device control quantity increasing/decreasing value dCONT is essentially set to 0. The prescribed temperature Texh1 is set to a temperature at which the effects obtained by regenerating the diesel particulate filter 12 (i.e., preventing uneven distribution of the particulate matter and reducing the exhaust resistance) can be balanced against the degradation of fuel economy and drivability that result from executing the regeneration process.

Although in the preceding explanation, it was determined if the exhaust gas temperature was greater than or equal to the prescribed temperature Texh1 by detecting the temperature Texhin of the exhaust gas at the inlet of the filter, it is also possible to determine if the exhaust gas temperature is greater than or equal to the prescribed temperature Texh1 based on the vehicle speed and the operating conditions of the engine 1 because the exhaust gas temperature is correlated with respect to the vehicle speed VSP and the operating conditions of the engine 1 (i.e., fuel injection quantity Tp and engine speed Ne).

Figure 3:
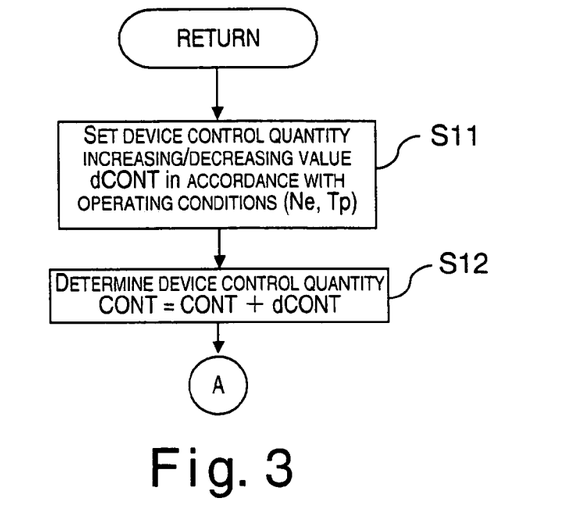
FIG. 3 is a flowchart showing a regeneration control routine for a diesel particulate filter used in the diesel engine illustrated in FIG. 1 in accordance with the present invention.
Figure 7:
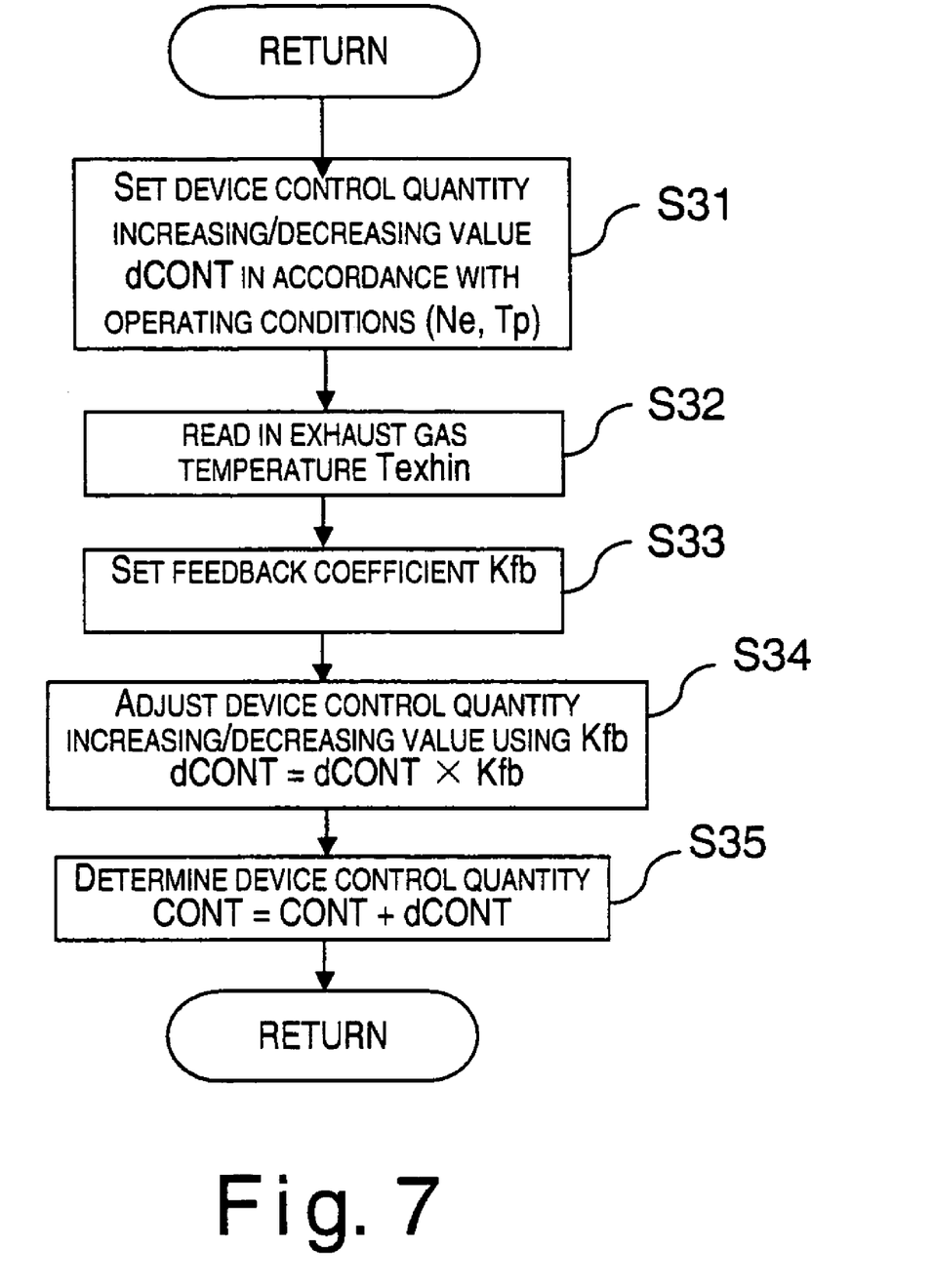
FIG. 7 is a flowchart of a regeneration control routine in accordance with a second embodiment of the present invention that is used with a diesel particulate filter installed in the diesel engine illustrated in FIG. 1.

Another embodiment of the present invention can be obtained by substituting the flowchart of FIG. 7 for the flowchart of FIG. 3 so that the difference between the actual exhaust gas temperature and the target exhaust gas temperature after the exhaust gas temperature has been raised during regeneration is calculated and feedback control is executed in order to make the exhaust gas temperature match the target exhaust gas temperature.

In step S31, similarly to step S11 of the flowchart shown in FIG. 3, the electronic control unit 21 sets a device control quantity increasing/decreasing value dCONT for adjusting the device control quantity base value CONT in accordance with the operating conditions.

In step S32, the electronic control unit 21 reads in the exhaust gas temperature Texhin at the inlet of the filter.

In step S33, the electronic control unit 21 sets a feedback coefficient Kfb in accordance with the difference between the target exhaust gas temperature tTexh (e.g., 600° C.) and the temperature Texhin. The feedback coefficient Kfb is set to 1 when the target exhaust gas temperature tTexh and the inlet exhaust gas temperature Texhin are the same and is increased as the difference between the two temperatures (tTexh−Texhin) increases (the feedback coefficient cannot be a negative number).

In step S34, the device control quantity increasing/decreasing value dCONT is multiplied by Kfb to adjust dCONT (dCONT=dCONT×Kfb).

In step S35, the electronic control unit 21 adds the device control quantity increasing/decreasing value dCONT to the device control quantity base value CONT to determine the final device control quantity CONT (=CONT+dCONT). In this embodiment, steps S31 to S35 constitute the regeneration control section.

By providing the regeneration device of the diesel particulate filter 12 with this kind of feedback function, the diesel particulate filter 12 can raised to the set temperature accurately during regeneration, thus enabling excellent combustion of the particulates.

The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2002-367231. The entire disclosure of Japanese Patent Application No. 2002-367231 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A particulate filter regenerating device comprising:
    an accumulated particulate quantity section configured to detect a quantity of particulate matter that has accumulated within a particulate filter;
    a regeneration timing determining section configured to determine a regeneration timing to initiate regeneration of the particulate filter by combusting particulate matter that has accumulated in the particulate filter when the exhaust gas temperature is equal to or greater than a prescribed temperature regardless of the quantity of particulate matter detected in the accumulated particulate quantity section; and
    a regeneration control section configured to execute control to combust particulate matter based on the regeneration timing determined by the regeneration timing determining section.

2. The particulate filter regenerating device recited in claim 1, wherein
    the regeneration timing determining section is further configured to determine the regeneration timing to regenerate the particulate filter
        during times when the accumulated particulate quantity reaches a prescribed quantity, and
        during times when the exhaust gas temperature is equal to or greater than the prescribed temperature.

3. The particulate filter regenerating device recited in claim 1, wherein
    the regeneration timing determining section is further configured to determine the regeneration timing to regenerate the particulate filter
        during times when the accumulated particulate quantity reaches a prescribed quantity, and
        during times when the exhaust gas temperature is equal to or greater than the prescribed temperature after a prescribed travel distance has been reached.

4. The particulate filter regenerating device recited in claim 1, wherein
    the regeneration timing determining section is further configured to determine the regeneration timing to regenerate the particulate filter
        during times when the accumulated particulate quantity reaches a prescribed quantity, and
        during times when a first prescribed travel distance has been reached.

5. The particulate filter regenerating device recited in claim 4, wherein
    the regeneration timing determining section is further configured to determine the regeneration timing to regenerate the particulate filter when a second prescribed travel distance has been reached that is smaller than the first prescribed travel distance and the exhaust gas temperature is equal to or greater than the prescribed temperature.

6. The particulate filter regenerating device recited in claim 1, wherein
    the regeneration control section is further configured to execute control of at least one regeneration control device to raise the temperature of the exhaust gas above the temperature that would normally exist.

7. The particulate filter regenerating device recited in claim 1, wherein
    the regeneration timing determining section includes a sensor that detects the exhaust gas temperature upstream of the particulate filter.

8. The particulate filter regenerating device recited in claim 1, wherein
    the regeneration timing determining section is configured to determine that the exhaust gas temperature is equal to or greater than the prescribed temperature based on the vehicle speed in order to regenerate the particulate filter.

9. The particulate filter regenerating device recited in claim 1, wherein
    the regeneration timing determining section is configured to determine that the exhaust gas temperature is equal to or greater than the prescribed temperature based on at least one operating condition of the engine in order to regenerate the particulate filter.

10. A particulate filter regenerating device comprising:
    a regeneration timing determining section including an accumulated particulate quantity section configured to detect a quantity of particulate matter that has accumulated within a particulate filter, the regeneration timing determining section being configured to determine a regeneration timing to selectively initiate regeneration of the particulate filter by combusting particulate matter that has accumulated in the particulate filter
        during times when the accumulated particulate quantity reaches a prescribed quantity, and
        during times when the accumulated particulate quantity is less than the prescribed quantity and an exhaust gas temperature is equal to or greater than a prescribed temperature; and
    a regeneration control section configured to execute control to combust particulate matter based on the regeneration timing determined by the regeneration timing determining section.

11. The particulate filter regenerating device recited in claim 10, wherein
    the regeneration timing determining section is further configured to determine the regeneration timing to regenerate the particulate filter
        during times when the accumulated particulate quantity reaches a first prescribed quantity, and
        during times when the accumulated particulate quantity reaches a second prescribed quantity that is smaller than the first prescribed quantity and the exhaust gas temperature is equal to or greater than the prescribed temperature.

12. An engine exhaust gas cleaning device comprising:
a particulate filter configured to be installed in an exhaust passage of an engine and configured to collect particulate matter from the exhaust gas; and
a particulate filter regenerating device configured to regenerate the particulate filter, the particulate filter regenerating device including
an accumulated particulate quantity section configured to detect a quantity of particulate matter that has accumulated within the particulate filter,
a regeneration timing determining section configured to determine a regeneration timing to regenerate the particulate filter by combusting particulate matter that has accumulated in the particulate filter when the exhaust gas temperature is equal to or greater than a prescribed temperature regardless of the quantity of particulate matter detected in the accumulated particulate quantity section; and
a regeneration control section configured to execute control for combusting particulate matter based on the regeneration timing determined by the regeneration timing determining section.

13. The engine exhaust gas cleaning device recited in claim 12, wherein
the regeneration timing determining section includes a sensor that detects the exhaust gas temperature upstream of the particulate filter.

14. The engine exhaust gas cleaning device recited in claim 12, wherein
the regeneration timing determining section is configured to determine that the exhaust gas temperature is equal to or greater than the prescribed temperature based on the vehicle speed in order to regenerate the particulate filter.

15. The engine exhaust gas cleaning device recited in claim 12, wherein
the regeneration timing determining section is configured to determine that the exhaust gas temperature is equal to or greater than the prescribed temperature based on at least one operating condition of the engine in order to regenerate the particulate filter.

16. The engine exhaust gas cleaning device recited in claim 12, wherein
the regeneration timing determining section is further configured to determine the regeneration timing to regenerate the particulate filter
during times when the accumulated particulate quantity reaches a prescribed quantity, and
during times when the exhaust gas temperature is equal to or greater than the prescribed temperature.

17. The engine exhaust gas cleaning device recited in claim 12, wherein
the regeneration timing determining section is further configured to determine the regeneration timing to regenerate the particulate filter
during times when the accumulated particulate quantity reaches a prescribed quantity, and
during times when the exhaust gas temperature is equal to or greater than the prescribed temperature after a prescribed travel distance has been reached.

18. An engine exhaust gas cleaning device comprising:
a particulate filter configured to be installed in an exhaust passage of an engine and configured to collect particulate matter from the exhaust gas; and
a particulate filter regenerating device configured to regenerate the particulate filter, the particulate filter regenerating device comprising
a regeneration timing determining section including an accumulated particulate quantity section configured to detect a quantity of particulate matter that has accumulated within the particulate filter, the regeneration timing determining section being configured to determine a regeneration timing to selectively initiate regeneration of the particulate filter by combusting particulate matter that has accumulated in the particulate filter
during times when the accumulated particulate quantity reaches a prescribed quantity, and
during times when the accumulated particulate quantity is less than the prescribed quantity and an exhaust gas temperature is equal to or greater than a prescribed temperature, and
a regeneration control section configured to execute control for combusting particulate matter based on the regeneration timing determined by the regeneration timing determining section.

19. The engine exhaust gas cleaning device recited in claim 18, wherein
the regeneration timing determining section is further configured to determine the regeneration timing to regenerate the particulate filter
during times when the accumulated particulate quantity reaches a first prescribed quantity, and
during times when the accumulated particulate quantity reaches a second prescribed quantity that is smaller than the first prescribed quantity and the exhaust gas temperature is equal to or greater than the prescribed temperature.

20. A particulate filter regenerating device comprising:
accumulated particulate quantity detecting means for detecting a quantity of particulate matter that has accumulated within a particulate filter;
regeneration timing determining means for determining a regeneration timing to initiate regeneration of the particulate filter by combusting particulate matter that has accumulated in the particulate filter when the exhaust gas temperature is equal to or greater than a prescribed temperature regardless of the quantity of particulate matter detected in the accumulated particulate quantity detecting means; and
regeneration control means for executing control to combust particulate matter based on the regeneration timing determined by the regeneration timing determining means.

* * * * *